US012581190B2

(12) United States Patent
Matsui et al.

(10) Patent No.: US 12,581,190 B2
(45) Date of Patent: Mar. 17, 2026

(54) IMAGING SYSTEM AND MOVING BODY PROVIDED WITH SAME

(71) Applicant: Panasonic Intellectual Property Management Co., Ltd., Osaka (JP)

(72) Inventors: Satoshi Matsui, Kyoto (JP); Norikazu Katsuyama, Osaka (JP); Yusuke Adachi, Osaka (JP); Yusuke Matsumoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 134 days.

(21) Appl. No.: 18/413,848

(22) Filed: Jan. 16, 2024

(65) Prior Publication Data

US 2024/0155233 A1     May 9, 2024

Related U.S. Application Data

(63) Continuation of application No. PCT/JP2022/016898, filed on Mar. 31, 2022.

(30) Foreign Application Priority Data

Jul. 21, 2021     (JP) ................................. 2021-120708

(51) Int. Cl.
    *H04N 23/68*        (2023.01)
    *G02B 7/198*        (2021.01)
    *H04N 23/73*        (2023.01)
(52) U.S. Cl.
    CPC .......... *H04N 23/682* (2023.01); *G02B 7/198* (2013.01); *H04N 23/6812* (2023.01); *H04N 23/73* (2023.01)

(58) Field of Classification Search
    CPC ............. H04N 23/682; H04N 23/6812; H04N 23/687; G02B 7/198; G04N 23/73; G01N 21/88; G03B 5/00; G03B 7/093; G03B 15/00; G03B 17/17
    See application file for complete search history.

(56) References Cited

U.S. PATENT DOCUMENTS

2015/0264242 A1*  9/2015  Tanaka ................. H04N 23/667
                                                      348/333.11
2016/0261798 A1*  9/2016  Ishikawa ................ H04N 23/58

FOREIGN PATENT DOCUMENTS

WO        2015/060181        4/2015
WO        WO-2021048963 A1 *  3/2021   ........... H04N 23/687

OTHER PUBLICATIONS

International Search Report issued in International Application No. PCT/JP2022/016898 on Jun. 14, 2022.

(Continued)

*Primary Examiner* — Lin Ye
*Assistant Examiner* — Steven Daniel Barry
(74) *Attorney, Agent, or Firm* — WENDEROTH, LIND & PONACK L.L.P.

(57)         ABSTRACT

An imaging system located on a moving body includes an imaging device, a blur correction assembly, and a controller. The blur correction assembly that corrects blur in movement direction of the moving body when the imaging device captures images during movement of the moving body. The controller controls exposure time of the imaging device, based on a movement velocity of the moving body and a correctable blur amount by the blur correction assembly.

14 Claims, 11 Drawing Sheets

(56)    References Cited

OTHER PUBLICATIONS

English translation of International Preliminary Report on Patentability issued Feb. 1, 2024 in International Application No. PCT/JP2022/016898.

* cited by examiner

Fig.3D

IMAGING SYSTEM AND MOVING BODY PROVIDED WITH SAME

CROSS-REFERENCE TO RELATED APPLICATIONS

This is a continuation application of International Application No. PCT/JP2022/016898, with an international filing date of Mar. 31, 2022, which claims priority of Japanese Patent Application No. 2021-120708 filed on Jul. 21, 2021, the content of which is incorporated herein by reference.

BACKGROUND

Technical Field

The present disclosure relates to an imaging system that corrects blur depending on movement of a moving body, and a moving body provided with the same.

Background Art

As transportation infrastructure ages, demand for infrastructure inspections is increasing. Inspection efficiencies are remarkably improved by imaging infrastructural facilities while moving with a moving body and detecting defective sites through image processing of captured images, instead of human visual inspections. However, imaging while moving causes blur in the captured images.

For example, in WO2015060181, blur caused by camera movement during exposure is corrected using Saccade Mirror technique. Blur is reduced by irradiating light onto an object to be imaged and causing light reflected on the object to be imaged to reflect on a mirror pivoting during predefined exposure time and fall on a camera.

SUMMARY

Since, however, an imaging system captures images of an object to be imaged while moving together with the moving body, it is desired to acquire a clearer image even if the movement velocity of the moving body varies.

The present disclosure provides an imaging system that reduces blur and captures images with proper exposure time, and a moving body including the same.

The imaging system of the present disclosure is an imaging system disposed on a moving body, the imaging system including: an imaging device having an imaging element that images an object to be imaged spaced apart from the moving body, the object to be imaged constituting at least a part of surroundings of the moving body; a blur correction assembly that corrects blur in movement direction of the moving body when the imaging device captures images during movement of the moving body; and a controller that controls exposure time of the imaging device, based on a movement velocity of the moving body and a correctable blur amount by the blur correction assembly.

The moving body of the present disclosure includes the imaging system described above.

According to the imaging system and the moving body including the same, it is possible to provide an imaging system that reduces blur and captures images with proper exposure time, and a moving body including the same.

BRIEF DESCRIPTION OF THE DRAWINGS

FIGS. 3D(a) and 3D(b) illustrate, in front view, the imageable range of the imaging element.

DETAILED DESCRIPTION

Embodiment

An embodiment will now be described with reference to the drawings. In the embodiment, a moving body is a vehicle 3 such as an automobile, and the case will be described as an example where an imaging system 1 is mounted on an upper portion of the vehicle 3.

[1. Imaging System Configuration]

Figure 1:
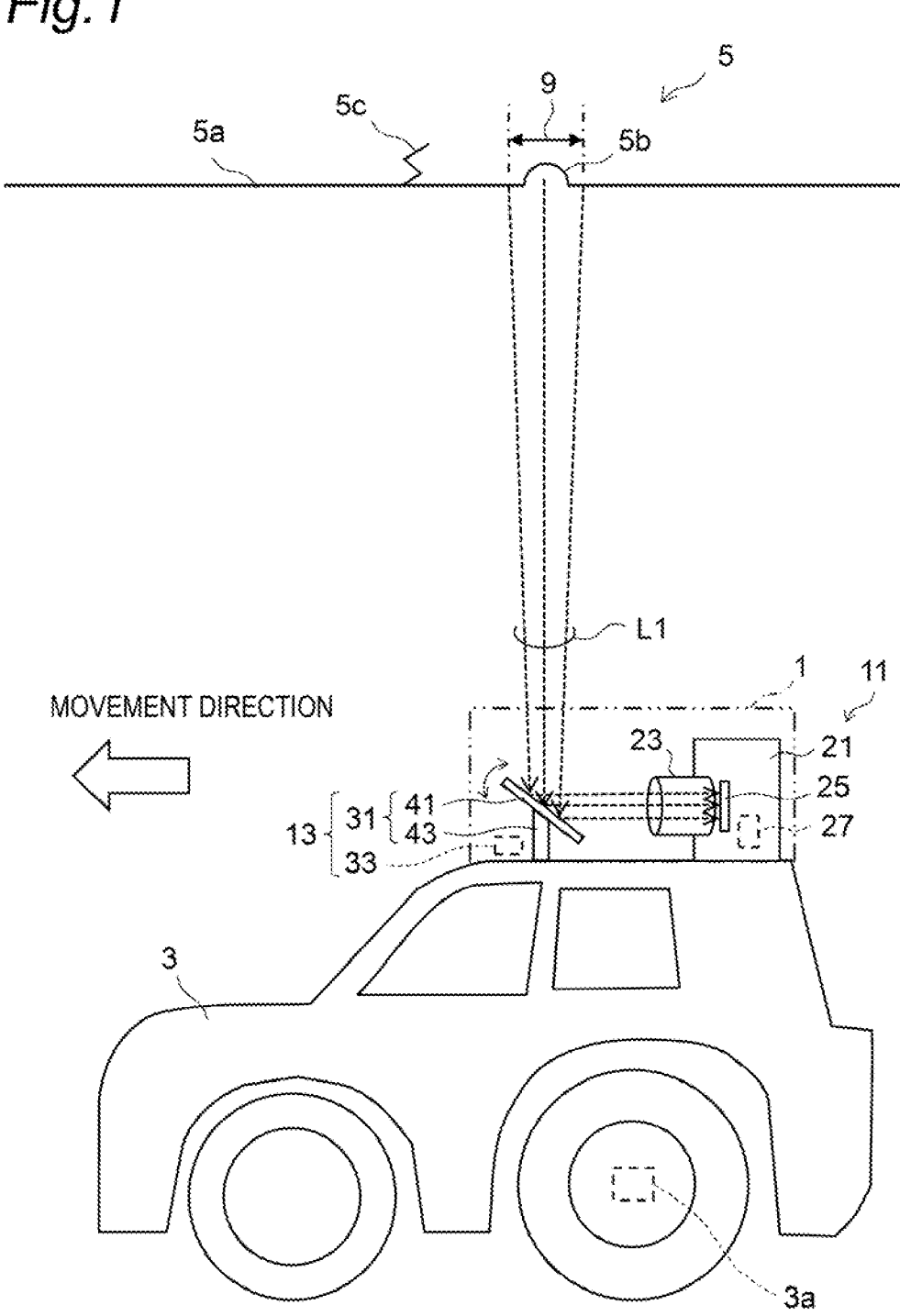
FIG. 1 illustrates a vehicle including an imaging system.
Figure 2:
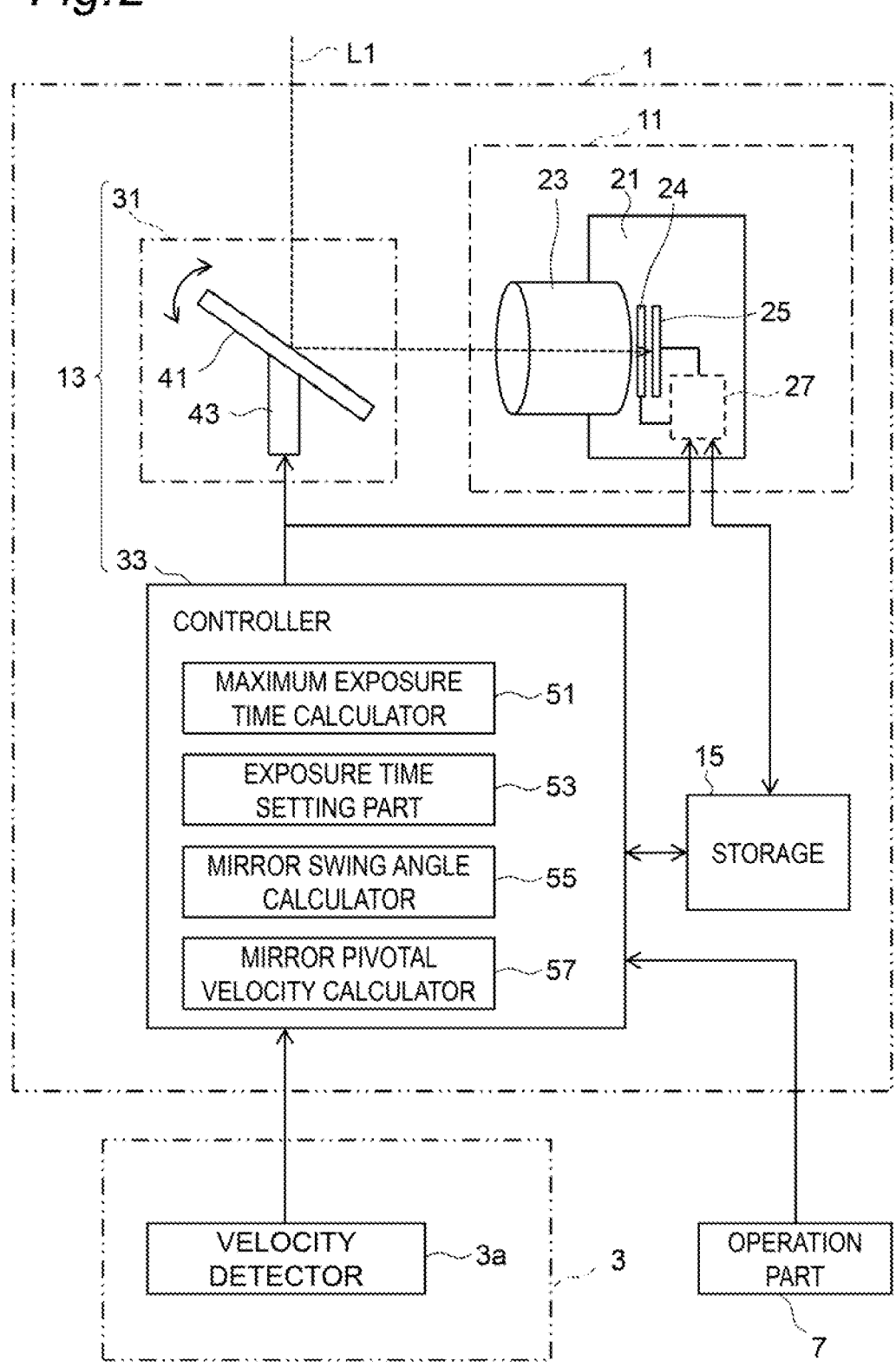
FIG. 2 is a block diagram showing an internal configuration of the imaging system of an embodiment.

FIG. 1 is a diagram for explaining the imaging system 1. FIG. 2 is a block diagram showing an internal configuration of the imaging system 1. In FIG. 1, the vehicle 3 is running, for example, through the interior of a tunnel 5. On a wall surface 5a inside the tunnel 5 there occurs, for example, a hole 5b or crack 5c.

An object to be imaged by the imaging system 1 is at least a part of a structure around the vehicle 3 and is the object that moves relatively according to the movement velocity of the vehicle 3 along with the movement of the vehicle 3. An area 9 to be imaged is an area to be acquired as an image in this object to be imaged. Other than the inner wall of the tunnel 5, the object to be imaged may be lateral surfaces or a bottom surface of an overpass, an electric pole, or an electric wire. This enables detection of holes, cracks, lifting, peeling, and joints of the object to be imaged, the inclination of the electric pole, and the deflection of the electric wire, by image processing based on images acquired.

The vehicle 3 includes a velocity detector 3a that detects the movement velocity of the vehicle 3. The velocity detector 3a is, for example, a vehicle velocity sensor that detects the movement velocity from the rotation speed of axles of the vehicle 3.

An imaging system 1 is located on an upper surface of the vehicle 3. Although in FIG. 1, the imaging system 1 is fixed so as to capture an image of the wall surface 5a of the tunnel 5 above the vehicle 3, it may be located so as to capture an image of the wall surface 5a lateral to or diagonally lateral to the vehicle 3 or an image of a road surface below the vehicle 3.

The imaging system 1 includes an imaging device 11, a blur correction device 13, and a storage 15. The imaging device 11 captures an image of surroundings of the vehicle 3, and, if the vehicle 3 runs through the interior of the tunnel 5, captures an image of the wall surface 5a of the tunnel 5. The imaging device 11 includes a camera body 21, a lens 23, a shutter 24, an imaging element 25, and a camera controller 27.

The lens 23 is replaceably attached to the camera body 21, which houses the imaging element 25 and the camera controller 27. The imaging element 25 is located at a position of a focal length F of the lens 23. The camera body 21 is arranged on the vehicle 3 so that the orientation of the lens 23 is parallel to a movement direction of the vehicle 3. For example, the camera body 21 is arranged so that the lens 23 faces the front or rear of the vehicle 3. The camera body 21 and the lens 23 may be of an integrated type, and, in this case, arrangement is such that the orientation of the lens 23 is perpendicular to the movement direction. The camera controller 27 opens the shutter 24 during reception of an exposure instruction signal from a controller 33. The shutter 24 may be configured such that a plurality of blade diaphragms are opened and closed, or may be an electronic shutter.

The blur correction device 13 corrects the optical path of light incident on the imaging system 1 so that image blur of the area 9 to be imaged is reduced even though the imaging device 11 captures images while the vehicle 3 moves. The blur correction device 13 includes the blur correction assembly 31 and the controller 33.

The blur correction assembly 31 corrects the optical path of reflection light L1 of ambient light reflected on the area 9 to be imaged in unison with movement of the vehicle 3. The blur correction assembly 31 aligns the direction of reflection light L1 of ambient light reflected on the area 9 to be imaged and the imaging direction of the imaging element 25. The blur correction assembly 31 includes, for example, a mirror 41 and a mirror drive 43. The blur correction assembly 31 is not limited thereto, and may be a assembly that pivotally drives a lens barrel having the lens 23 and the imaging element 25 integrated, for example, in the pan direction and the tilt direction around a pivot axis, or may be a assembly that pivotally drives the entire imaging device 11 in an arc around the area 9 to be imaged within a plane containing the movement direction of the vehicle 3.

The mirror 41 is arranged pivotally so as to face the lens 23. For example, the mirror 41 is pivotable in both the clockwise positive direction and the reverse directions, and the pivotable angular range may be less than 360 degrees or may be equal to or greater than 360 degrees. The mirror 41 totally reflects ambient light reflected on the object to be imaged toward the direction of the imaging device 11. The mirror drive 43 pivotally drives the mirror 41 from an initial angle to an instructed angle, and again returns the mirror 41 to the initial angle after pivoting it to the instructed angle. The mirror drive 43 is, for example, a motor. The pivotal angle of the mirror 41 is limited by mechanical constraints of the mirror drive 43, and the mirror 41 can be pivoted up to a maximum swing angle of the mirror 41 that is determined by this limitation. A movement blur correction angle $\theta$ allowing movement blur correction is equal to or less than the maximum swing angle of the mirror. A maximum correctable angle $\theta$ max as the maximum value of the movement blur correction angle $\theta$ will be detailed later.

Figure 3A:
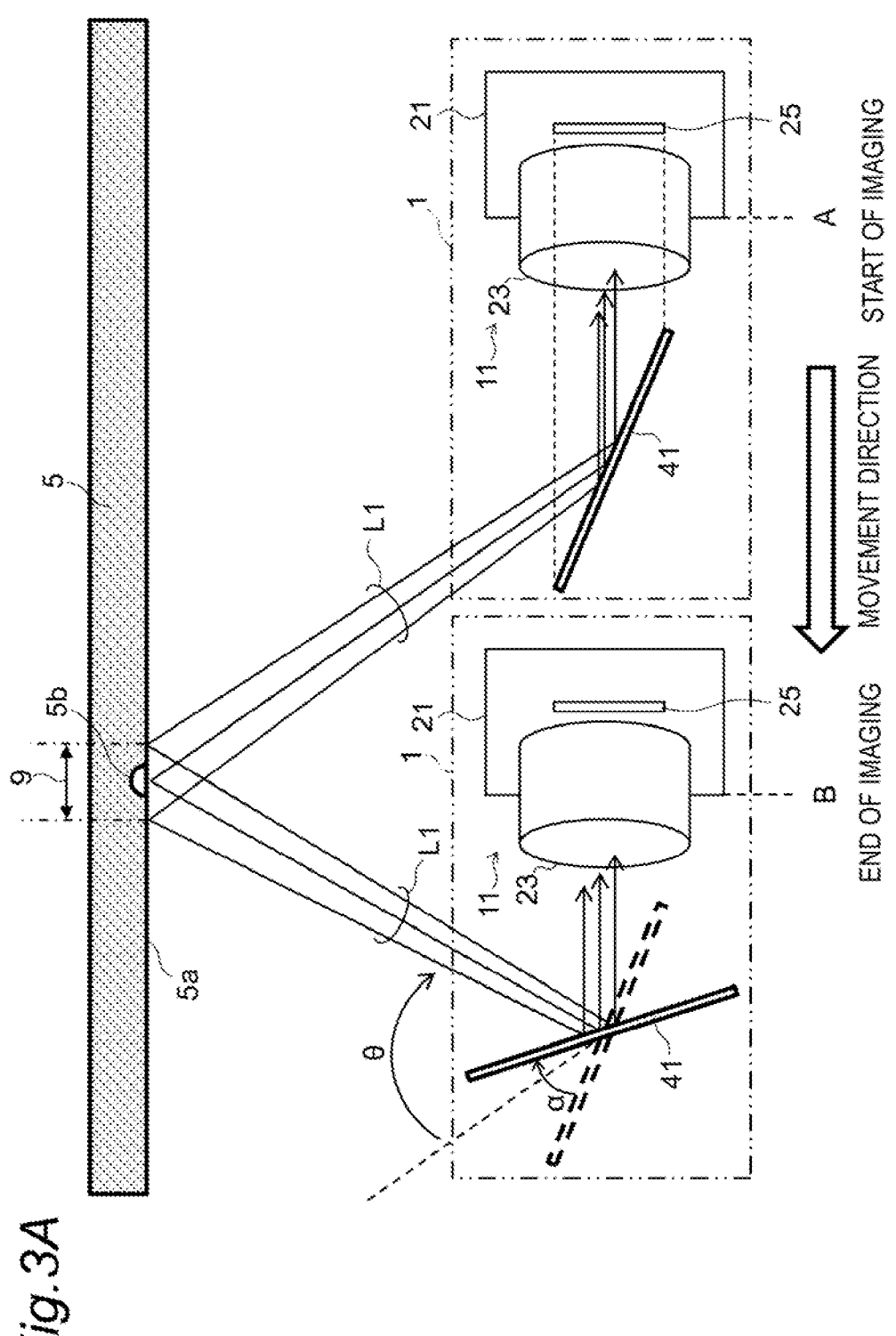
FIG. 3A illustrates blur correction in the imaging system.
Figure 4A:
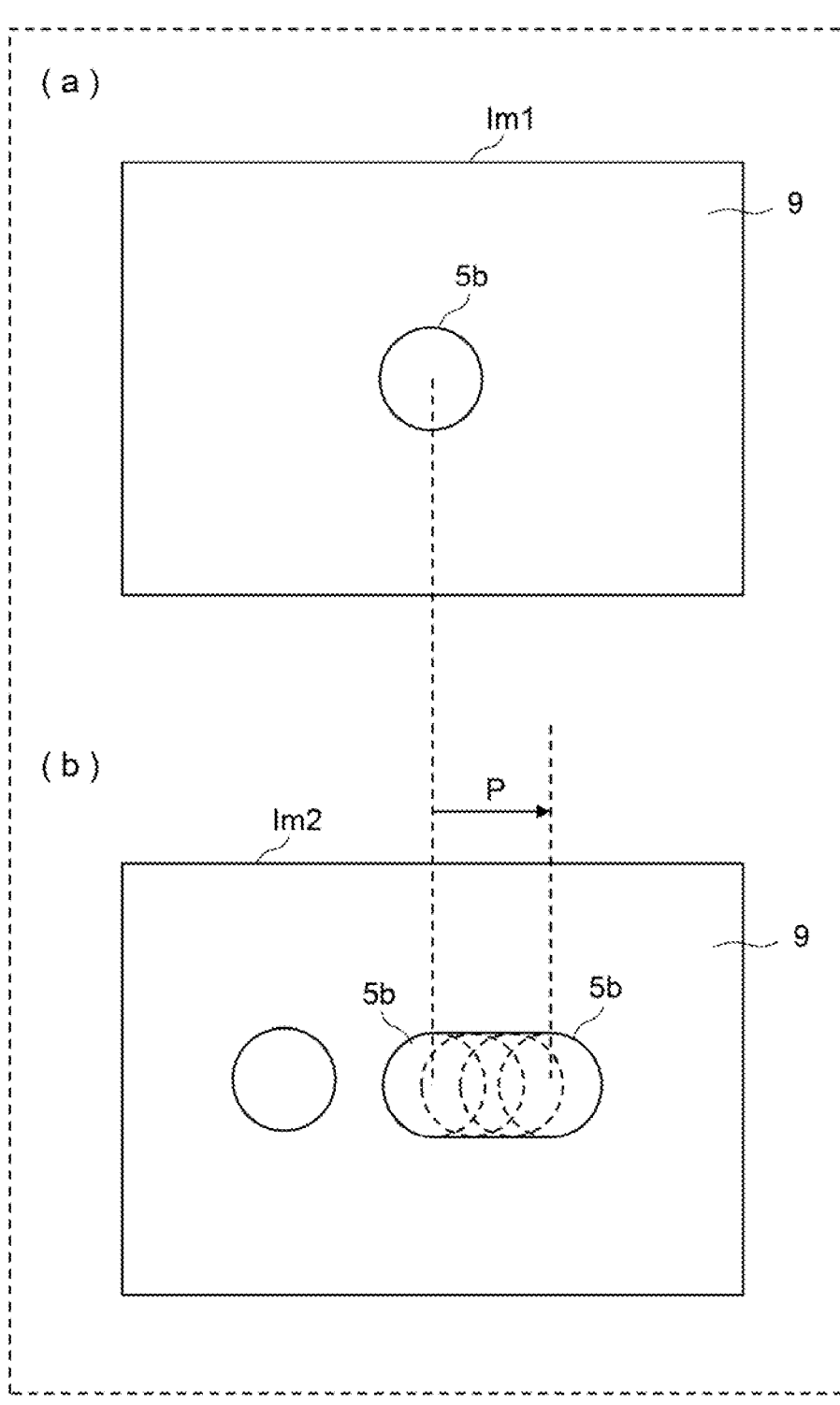
FIGS. 4A(a) and 4A(b) illustrate images captured without blur correction.

Referring to FIGS. 3A and 4A, the blur correction by the blur correction device 13 will be described. FIG. 3A is an explanatory view explaining the blur correction in the imaging system 1. FIG. 4A shows images captured without the blur correction, with FIG. 4A(a) showing an image at imaging start timing, FIG. 4A(b) showing an image at imaging end timing.

Assume, for example, that the imaging system 1 located at a position A moves to a position B together with the vehicle 3 in exposure time. The imaging system 1 starts imaging at the position A, an image Im1 acquirable at which timing is shown in FIG. 4A(a). In the image Im1, for example, a hole 5b of the area 9 to be imaged is captured. However, the image Im1 is a dark image and is not clear due to insufficient exposure time.

Accordingly, the imaging system 1 continues exposure until the vehicle 3 moves to the position B. In this case, if no blur correction is carried out, the area 9 to be imaged moves relatively in the direction opposite to the movement direction of the vehicle 3, with the result that an image Im2 is obtained where the hole 5b moves relatively, as shown in FIG. 4A(b). In the image Im2, a movement amount P of pixel is detected as the blur amount. In this manner, an image captured by the imaging device 11 during movement of the vehicle 3 becomes a blurred image.

Hence, by allowing a movement direction end of the mirror 41 to pivot the mirror 41 in a direction to cancel the relative movement of the object to be imaged, during the exposure time, depending on the movement velocity of the imaging system 1 and the vehicle 3, the imaging system 1 can capture the same area 9 to be imaged in a captured image during the exposure time, enabling acquisition of an image with remarkably reduced blur. In FIG. 1, the mirror 41 is pivoted clockwise so that the movement direction end of the mirror 41 turns facing the object to be imaged during the exposure time. By pivoting the mirror 41, the movement amount P of pixel is corrected to zero in the image Im2.

Figure 3B:
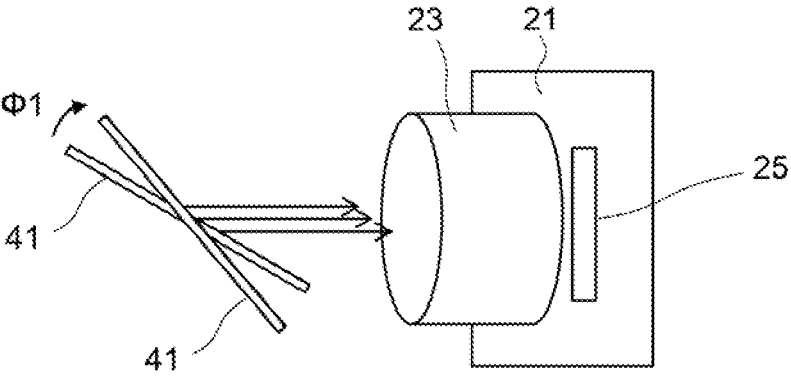
FIG. 3B illustrates a pivotable range of a mirror.
Figure 3C:
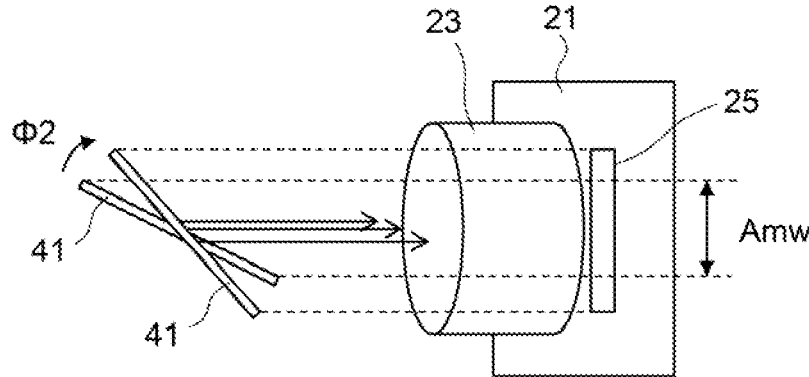
FIG. 3C illustrates an imageable range of an imaging element.
Figure 3D:
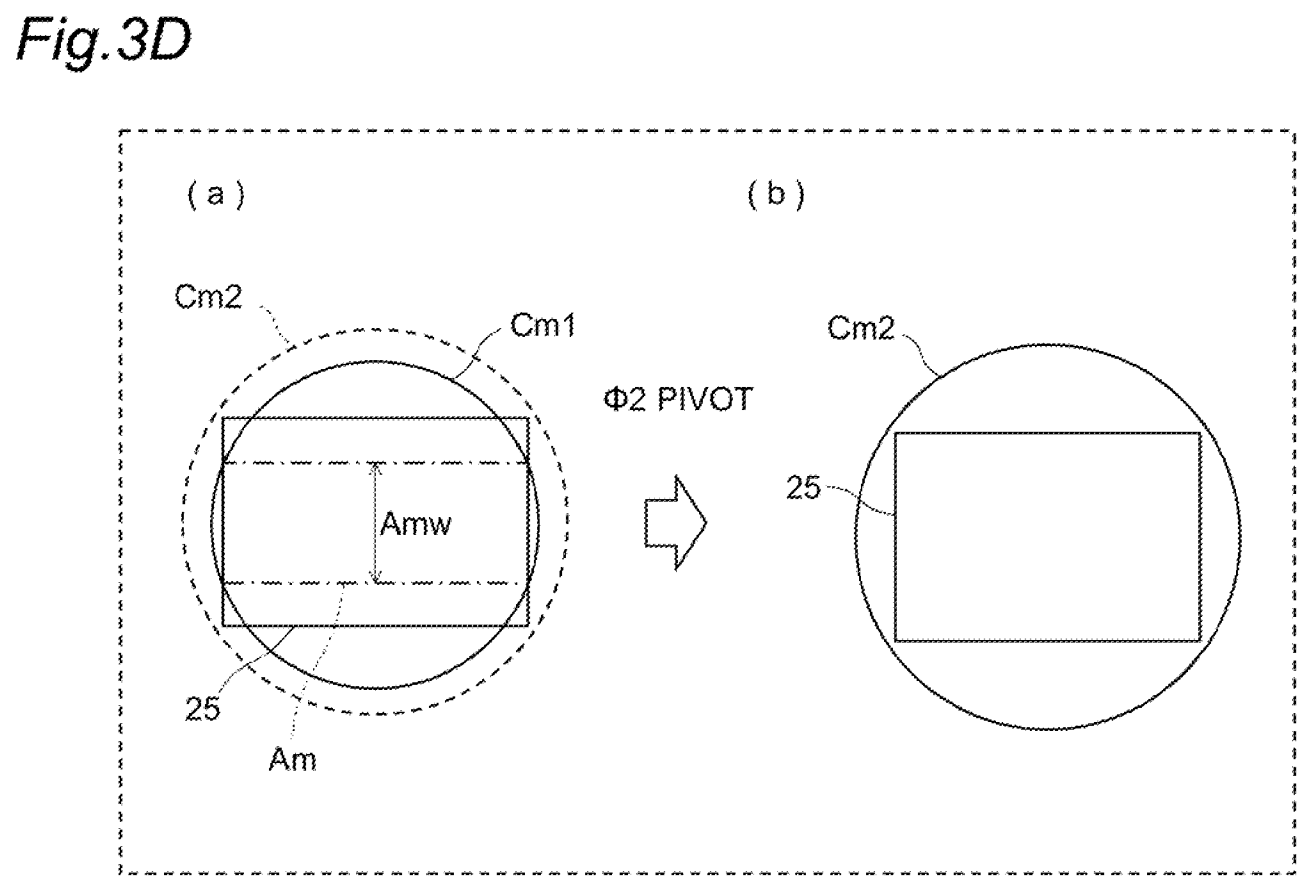

The maximum correctable angle $\theta$ max will then be described with reference to FIGS. 3B to 3D. FIG. 3B is an explanatory view showing a pivotable range of the mirror 41. FIG. 3C is an explanatory view showing an imageable range of the imaging element 25. FIG. 3D is an explanatory view showing, in front view, the imageable range of the imaging element 25.

The maximum correctable angle $\theta$ max is determined mainly by two factors. The first factor is a maximum swing angle, i.e., a maximum mechanical angle $\Phi 1$, through which the mirror 41 itself is pivotable within an imaging interval, as shown in FIG. 3B. The second factor is a maximum angle $\Phi 2$ usable within a pixel range Am used by the imaging element 25, irrespective of the pivotal angle off the mirror 41, as shown in FIG. 3C. This pixel range Am need not include all pixels of the imaging element 25 used in the inspection, and, with an emphasis on securing the correction angle, it may be a pixel range narrower than the total pixel range. The maximum correctable angle $\theta$ max is determined by the first factor in the case of an assembly that pivotally drives a lens barrel having the lens 23 and the imaging element 25 integrated, for example, in the pan direction or the tilt direction around a pivot axis, or an assembly that pivotally drives the entire imaging device 11 in an arc around the area 9 to be imaged within a plane containing the movement direction of the vehicle 3.

As shown in FIG. 3C, for example, the mirror 41 at the pivoting start position has an approximately horizontal reflecting surface, so that the mirror width Amw in the lens radial direction at the pivoting start position is smaller than the width at the time when the mirror 41 has pivoted Φ2. Hence, as shown in FIG. 3D(a), an image circle Cm1 at the pivoting start position is smaller than an image circle Cm2 after Φ2 pivoting. On the other hand, as shown in FIG. 3D(b), the image circle Cm2 after Φ2 pivoting may be designed so that the outer shape of the imaging element 25 is internally tangent thereto, or the image circle Cm2 may be designed so that the outer shape of the imaging element 25 is internally tangent thereto when the mirror 41 has an inclination angle of 45 degrees relative to the horizontal plane. The maximum correctable angle θ max is the angle of smaller one of these maximum mechanical angle Φ1 and maximum angle Φ2.

Figure 4B:
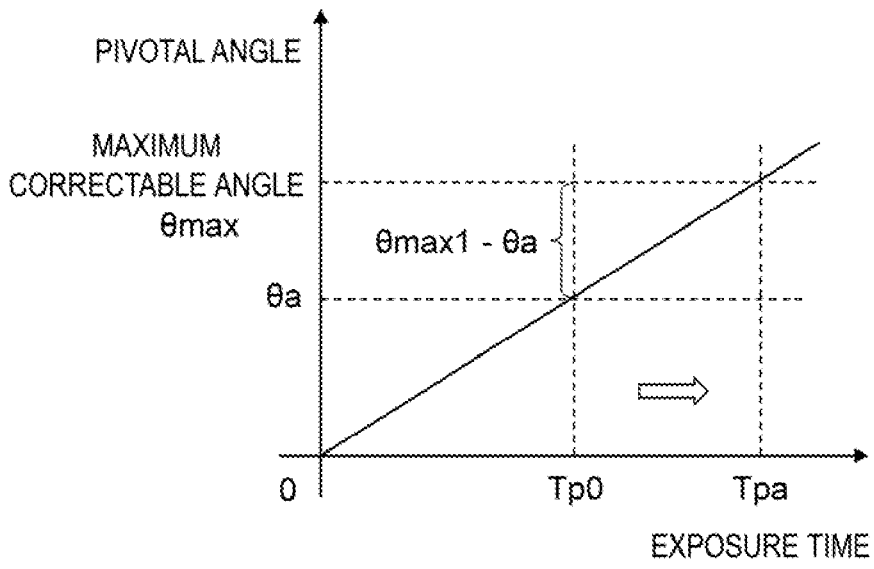
FIG. 4B is a graph showing a relationship between pivotal angle of the mirror and exposure time at low-velocity driving.
Figure 4C:
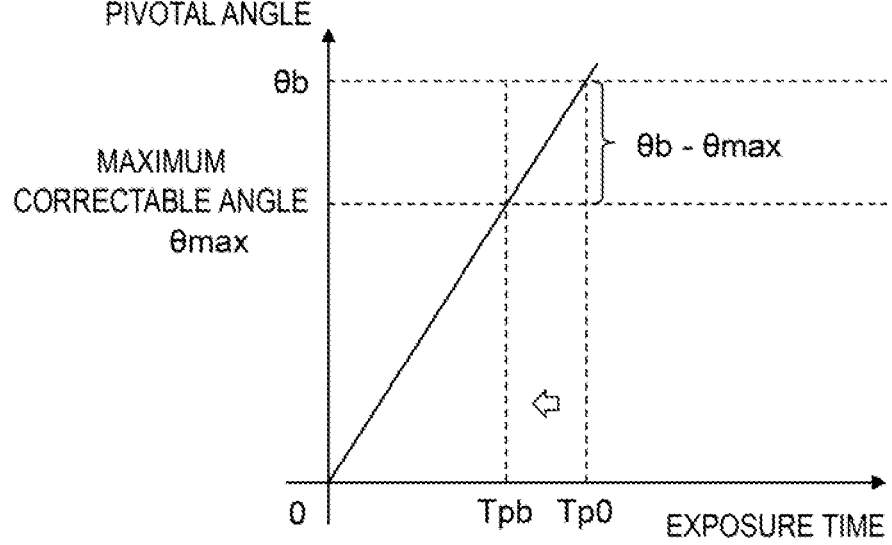
FIG. 4C is a graph showing a relationship between pivotal angle of the mirror and exposure time at high-velocity driving.

Referring then to FIGS. 4B and 4C, control of the exposure time will be described. FIG. 4B is a graph showing a relationship between pivotal angle of the mirror 41 and exposure time at low-velocity driving, and FIG. 4C is a graph showing a relationship between pivotal angle of the mirror 41 and exposure time at high-velocity driving. The relationship between the exposure time and the maximum correctable angle θ max is such that it is possible to lengthen the exposure time as the time during which the mirror 41 pivots the maximum correctable angle θ max according as the movement velocity of the vehicle 3 becomes lower.

As shown in FIG. 4B, for example, in the case of imaging with previously set initial exposure time Tp0, since a correction angle θa corresponding to the initial exposure time Tp0 at the time when the vehicle 3 runs at a low velocity can afford to increase the pivotal angle by (θ max1-θa) up to the maximum correctable angle θ max, it is possible to acquire a bright image with even more light amount by lengthening the exposure time up to exposure time Tpa longer than the initial exposure time Tp0. On the other hand, as shown in FIG. 4C, for example, in the case where a correction angle θb corresponding to the initial exposure time Tp0 at the time when the vehicle 3 runs at a high velocity is greater than the maximum correctable angle θ max, it is not possible to reduce blurring corresponding to the amount of correction angle exceeding the correction angle θ max. Thus, by shortening the exposure time to an exposure time Tpb shorter than the initial exposure time Tp0, the pivotal angle of the mirror 41 can be the maximum correctable angle θ max, making it possible to obtain a maximum luminance within a range capable of implementing blur correction.

A correctable movement amount Pmax of pixel corresponding to the maximum correctable angle θ max exists, which is a correctable blur amount Sf. That is, the correctable blur amount Sf is a correctable pixel blur amount of the imaging element 25 and is determined from the maximum correctable angle θ max and the focal length F of the lens 23, using Formula (1) which follows:

$$Sf \text{ [mm]}=\tan(\theta \text{ max})\cdot F \text{ [mm]} \tag{1}$$

Since the focal length F of the lens 23 is constant during image capturing, the correctable blur amount Sf corresponds to the maximum correctable angle θ max. The correctable blur amount Sf is corrected by the blur correction assembly 31 controlled by the controller 33. In this manner, the correctable blur amount Sf is defined by a changing angle of the blur correction assembly 31 and the pixel range Am of the imaging element 25. The blur correction assembly 31 includes a pivotable blur corrector, and the changing angle is a pivotal angle of the blur corrector. In other words, the changing angle is an angle by which the blur correction assembly 31 changes the direction of light reflected on an object to be imaged toward the imaging direction of the imaging element. In the case where, for example, the blur correction assembly 31 pivots the mirror 41, the changing angle is a pivotal angle of the mirror 41 equivalent to the blur corrector. In the case of the assembly that pivotally drives the lens barrel having the lens 23 and the imaging element 25 integrated, for example, in the pan direction or the tilt direction around the pivot axis, or the assembly that pivotally drives the entire imaging device 11 in an arc around the area 9 to be imaged within the a plane containing the movement direction of the vehicle 3, the changing angle is a pivotal angle of these pivotally driving assembly acting as the blur correctors.

A configuration will then be described hereinbelow where the maximum exposure time is controlled considering the maximum correctable angle θ max based on the constraint of the blur correction device 13 and the movement velocity V of the vehicle 3.

Reference is made to FIGS. 2 and 3A. The controller 33 controls the blur correction assembly 31, for blur correction. The controller 33 controls the blur correction assembly 31, on the basis of the correctable blur amount Sf, the movement velocity of the vehicle 3, and the exposure time Tp. The controller 33 includes a maximum exposure time calculator 51, an exposure time setting part 53, a mirror swing angle calculator 55, and a mirror pivotal velocity calculator 57.

The controller 33 is a circuit that can be implemented by a semiconductor element or the like. The controller 33 can be configured by, for example, a microcomputer, a CPU, an MPU, a GPU, a DSP, an FPGA, or an ASIC. Functions of the controller 33 may be configured by only hardware, or may be implemented by combining hardware and software together. The controller 33 reads out data or programs stored in the storage 15 to perform various arithmetic processes, to thereby implement predefined functions.

The maximum exposure time calculator 51 calculates the maximum exposure time Tmax from the movement velocity V1, the subject magnification M, the focal length F, and the maximum correctable angle θ max, using Formula (2) which follows:

$$T\max=F\cdot\tan(\theta \text{ max})\cdot60^2/(V1\cdot M\cdot10^3) \tag{2}$$

The focal length F is a value determined by the lens 23. The subject magnification M is a value determined by the focal length F and the subject distance. The subject distance is a distance from a principal point of the lens 23 arranged between the object (hole 5b) to be imaged as the subject and the imaging element 25, to the object (hole 5b) to be imaged. The subject distance may be a known value measured in advance, or a value measured by a distance meter during image capturing. The maximum correctable angle θ max is a value determined by the maximum swing angle through which the mirror 41 is pivotable and the pixel range Am of the imaging element 25, as described above. The maximum correctable angle θ max is a value determined also by a relationship between the diameter of the mirror 41 and the diameter of the lens 23. Since the maximum correctable angle θ max and the correctable blur amount Sf do not depend on the movement velocity, they are stored, for example, in the form of a lookup table linked with movement velocity, in the storage 15.

The exposure time setting part 53 determines whether the exposure time Tp is equal to or less than the maximum exposure time Tmax. Immediately after start of blur correction, the initial exposure time Tp0 previously stored in the storage 15 is used as the exposure time Tp. The exposure time setting part 53 reads out the initial exposure time Tp0 from the storage 15. The initial exposure time Tp0 is, for example, standard exposure time when the vehicle 3 moves at a first movement velocity V1. The movement velocity V1 is, for example, 80 km/h. After start of imaging, the exposure time Tp is exposure time when imaged earlier, for example, exposure time Tp of the preceding frame.

The storage 15 may previously store a plurality of different initial exposure times Tp0 corresponding to imaging conditions so that, in accordance with an instruction of imaging conditions given from an operation part 7, an initial exposure time Tp0 corresponding to the instructed conditions is read out from the plurality of initial exposure times Tp0.

When the exposure time setting part 53 determines that the exposure time Tp is greater than the maximum exposure time Tmax, it sets the exposure time Tp to the maximum exposure time Tmax. When the exposure time setting part 53 determines that the exposure time Tp is equal to or less than the maximum exposure time Tmax, it may set intactly the exposure time Tp determined as a first exposure time Tp1 for next imaging, or may set the exposure time Tp to a value not less than the determined exposure time Tp and not more than the maximum exposure time Tmax. The first exposure time Tp1 set by the exposure time setting part 53 is sent to the mirror swing angle calculator 55.

The mirror swing angle calculator 55 calculates the mirror swing angle $\alpha$ of the mirror 41 during image capturing, on the basis of the movement velocity V1 of the vehicle 3, the set first exposure time Tp1, the subject magnification M, and the focal length F of the lens 23, along the following flow.

A movement amount L of the vehicle 3 between imaging start time t1 and imaging end time t2 is calculated from the movement velocity V1 and the first exposure time Tp1, using Formula (3) which follows:

$$L \text{ [mm]} = V1 \text{ [km/h]} \cdot 10^6 Tp1 \text{ [ms]}/(60^2 \cdot 10^3) \tag{3}$$

The movement amount P of pixel on the imaging element 25 between the imaging start time t1 and the imaging end time t2 is calculated from the movement amount L of the vehicle 3 and the subject magnification M, using Formula (4) which follows:

$$P \text{ [mm]} = L \text{ [mm]} \cdot M \tag{4}$$

Since this movement amount P of pixel causes blurring, to avoid blurring, the optical path of light incident on the lens 23 is changed by the movement blur correction angle $\theta$ correspondingly to the movement amount P of pixel. The movement blur correction angle $\theta$ is calculated from the movement amount P of pixel and the focal length F, using Formula (5) which follows:

$$\theta \text{ [deg]} = \arctan(P/F) \tag{5}$$

Since the mirror swing angle $\alpha$ necessary for blur correction during exposure is half the size of the movement blur correction angle $\theta$, it is calculated using Formula (6) which follows:

$$\alpha = \theta/k \tag{6}$$

Here, k=2 in the case of the configuration where light from the object to be imaged travels in the order of the mirror 41, the lens 23, and the imaging element 25, as in the embodiment of FIG. 1. k=1 in the case of the configuration employing the pan and tilt assembly or the entire camera driving.

In this manner, the mirror swing angle calculator 55 calculates the mirror swing angle $\alpha$ of the mirror 41.

The mirror pivotal velocity calculator 57 calculates a pivotal velocity Vm of the mirror 41 from the mirror swing angle $\alpha$ and the exposure time Tp, using Formula (7) which follows:

$$Vm = \alpha/Tp \tag{7}$$

Accordingly, by pivoting the mirror 41 in the opposite direction to the movement direction at the pivotal velocity Vm after start of imaging, the imaging device 11 can receive light from the same object 9 to be imaged during the exposure time, making it possible to suppress generation of movement blur in the image captured.

However, the movement blur correction angle $\theta$ has the maximum correctable angle $\theta$ max described above, and if this maximum correctable angle $\theta$ max is exceeded, blur cannot be corrected.

The storage 15 is a storage medium that stores programs and data required for implementing the functions of the controller 33. The storage 15 can be implemented by, for example, a hard disk drive (HDD), a solid state drive (SSD), a RAM, a DRAM, a ferroelectric memory, a flash memory, a magnetic disk, or a combination thereof.

The operation part 7 is an input device for the user to instruct the controller 33. The operation part 7 may be an input device dedicated to the imaging system 1 or may be a handheld terminal such as a smartphone. In the case of using the handheld terminal as the operation part 7, the operation part 7 and the controller 33 interchange data with each other via wireless communication. Using the operation part 7, the user may instruct the controller 33 of whether the area to be imaged is an indoor dark area such as the interior of a tunnel or an outdoor bright area such as a mountain slope, or may instruct the controller 33 of an imaging interval Tf. The imaging interval Tf is time between current imaging timing and next image capturing. In the case of capturing moving images, the imaging interval Tf is time of one frame, and in the case of capturing still images, it is a time interval of images to be captured.

[2. Action of Imaging System]

Figure 5:
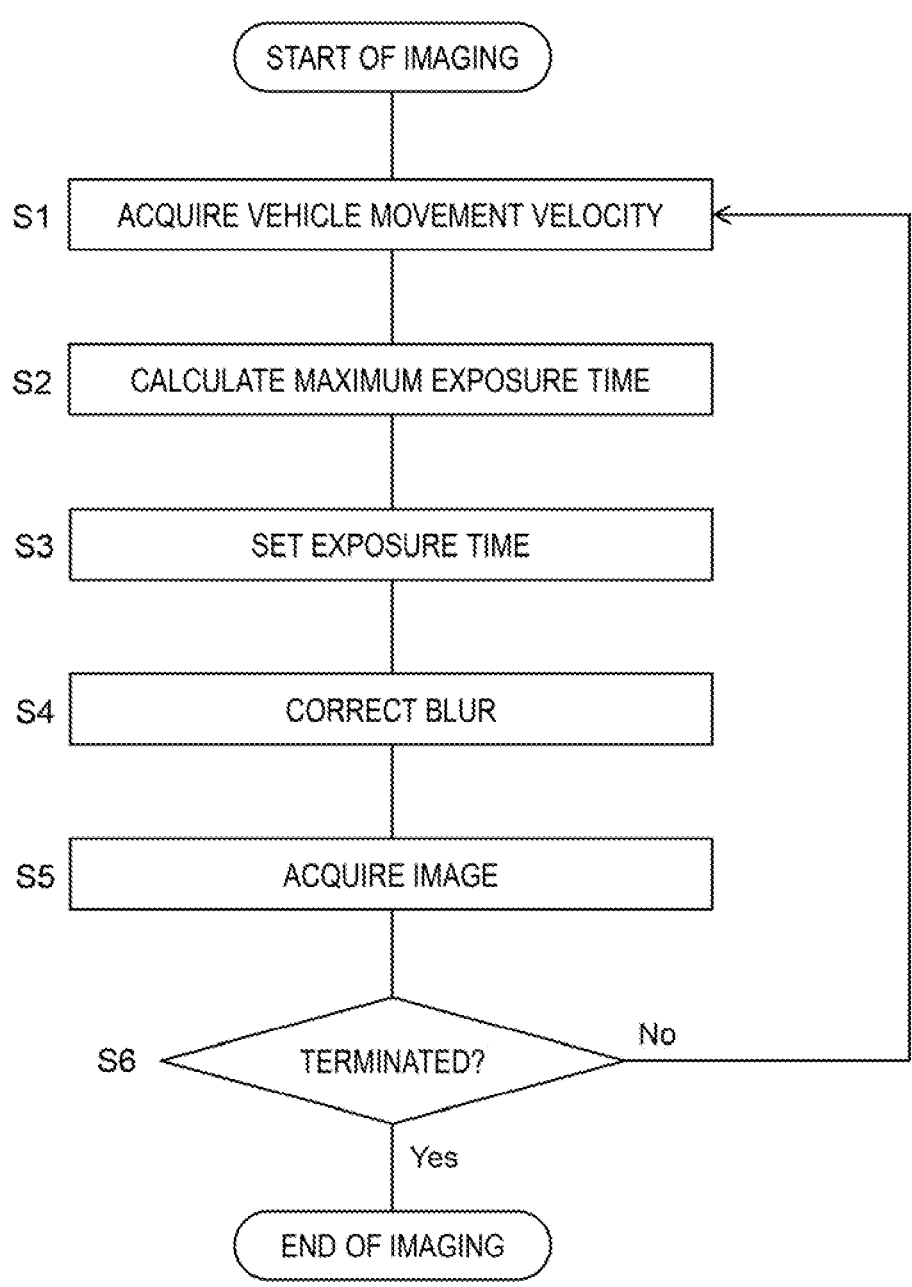
FIG. 5 is a flowchart showing imaging processing of the embodiment.
Figure 6:
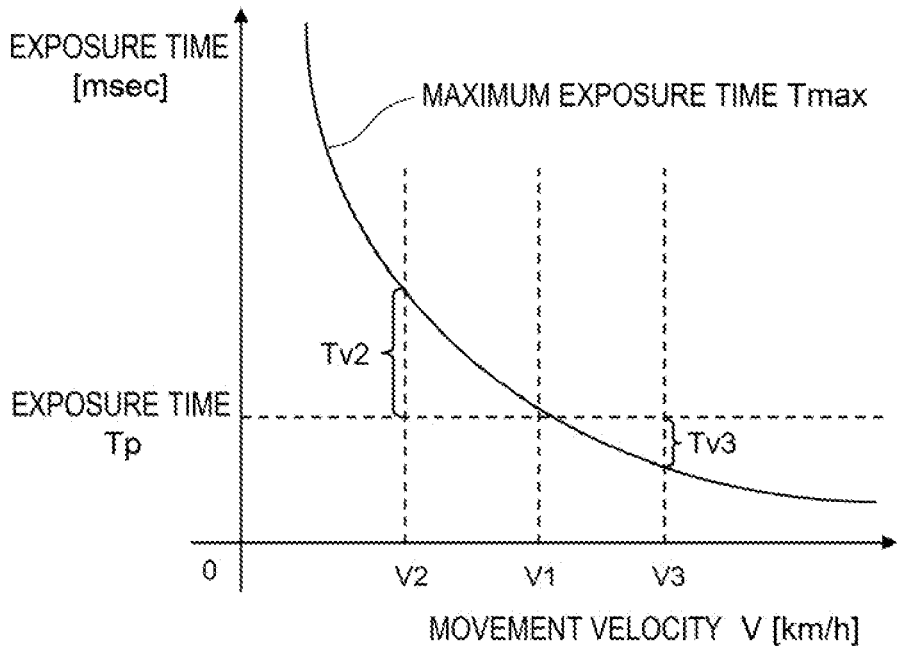
FIG. 6 is a graph showing a relationship between movement velocity and maximum exposure time.

Referring then to FIGS. 5 and 6, action of the imaging system 1 will be described. FIG. 5 is a flowchart showing imaging processing performed by the imaging system 1. FIG. 6 is a graph showing a relationship between the movement velocity and the maximum exposure time. The imaging processing shown in FIG. 5 is started, for example, when an instruction to start imaging is issued from the operation part 7 during movement of the vehicle 3.

The controller 33 acquires the movement velocity V1 of the vehicle 3 from the velocity detector 3a (step S1). The controller 33 calculates the maximum exposure time Tmax from the movement velocity V1, the maximum correctable angle $\theta$ max, the subject magnification M, and the focal length F, using Formula (2) (step S2).

Next, the exposure time setting part 53 sets the exposure time to the maximum exposure time Tmax or less (step S3). Since, immediately after start of imaging, the exposure time setting part 53 reads out, as the exposure time, the initial exposure time Tp0 stored in the storage 15, it adjusts this initial exposure time Tp0 with respect to the movement velocity V1. As shown in FIG. 6, the maximum exposure time Tmax reduces according as the movement velocity of the vehicle 3 increases.

In the case where, for example, the vehicle 3 runs at a movement velocity V2 (e.g., 50 km/h) on a normal road, the difference between the maximum exposure time Tmax and the initial exposure time Tp0 is time Tv2. Accordingly, the exposure time setting part 53 can extend the exposure time from the initial exposure time Tp0 by the time Tv2 at a maximum and sets this extended exposure time as the first exposure time Tp1. This allows sufficient light amount during image capturing to be ensured, achieving reduction of blur, which results in acquisition of clear images.

In the case where, for example, the vehicle 3 runs at a movement velocity V3 (e.g., 100 km/h) on an expressway, the maximum exposure time Tmax is smaller than time Tv3 than the initial exposure time Tp0. Hence, the exposure time setting part 53 sets the first exposure time Tp1 to the maximum exposure time Tmax smaller than the initial exposure time Tp0, thereby enabling acquisition of image having highest luminance with blurring reduced.

Based on the set first exposure time Tp1, the mirror swing angle calculator 55 calculates the movement blur correction angle θ and the mirror swing angle α, while the mirror pivotal velocity calculator 57 calculates the mirror pivotal velocity. The controller 33 causes the mirror 41 to pivot at the calculated mirror pivotal velocity by the mirror drive 43 so that the mirror 41 starts to pivot from the predefined initial angle. Blur correction during image capturing of the imaging device 11 is thereby carried out (step S4). At the same time, for example, the controller 33 continues to send a Hi signal as ON signal for instruction of exposure, to the camera controller 27 during the first exposure time Tp1.

In the imaging device 11, the camera controller 27 opens the shutter 24 for exposure during reception of the Hi signal, to acquire an image (step S5), and stores the acquired image into the storage 15. After lapse of the first exposure time Tp1, the controller 33 continues to send a Low signal as OFF signal for instruction of stop of exposure, to the camera controller 27. The Low signal may be used as On signal for instruction of exposure, while the Hi signal may be used as Off signal for instruction of stop of exposure.

During reception of the Low signal, the camera controller 27 closes the shutter 24, while the controller 33 causes the mirror 41 to reversely pivot by the mirror drive 43, to return the mirror 41 to its initial angle. The mirror drive 43 may return the mirror 41 to its initial angle by causing the mirror 41 to forward pivot.

The controller 33 determines whether a series of image capturing has terminated (step S6), and, if affirmative (step S6: Yes), brings image capturing in movement to an end. If the controller 33 determines that image capturing has not yet terminated (step S6: No), it again goes back to step S1 to capture an image at the next frame.

Figure 7:
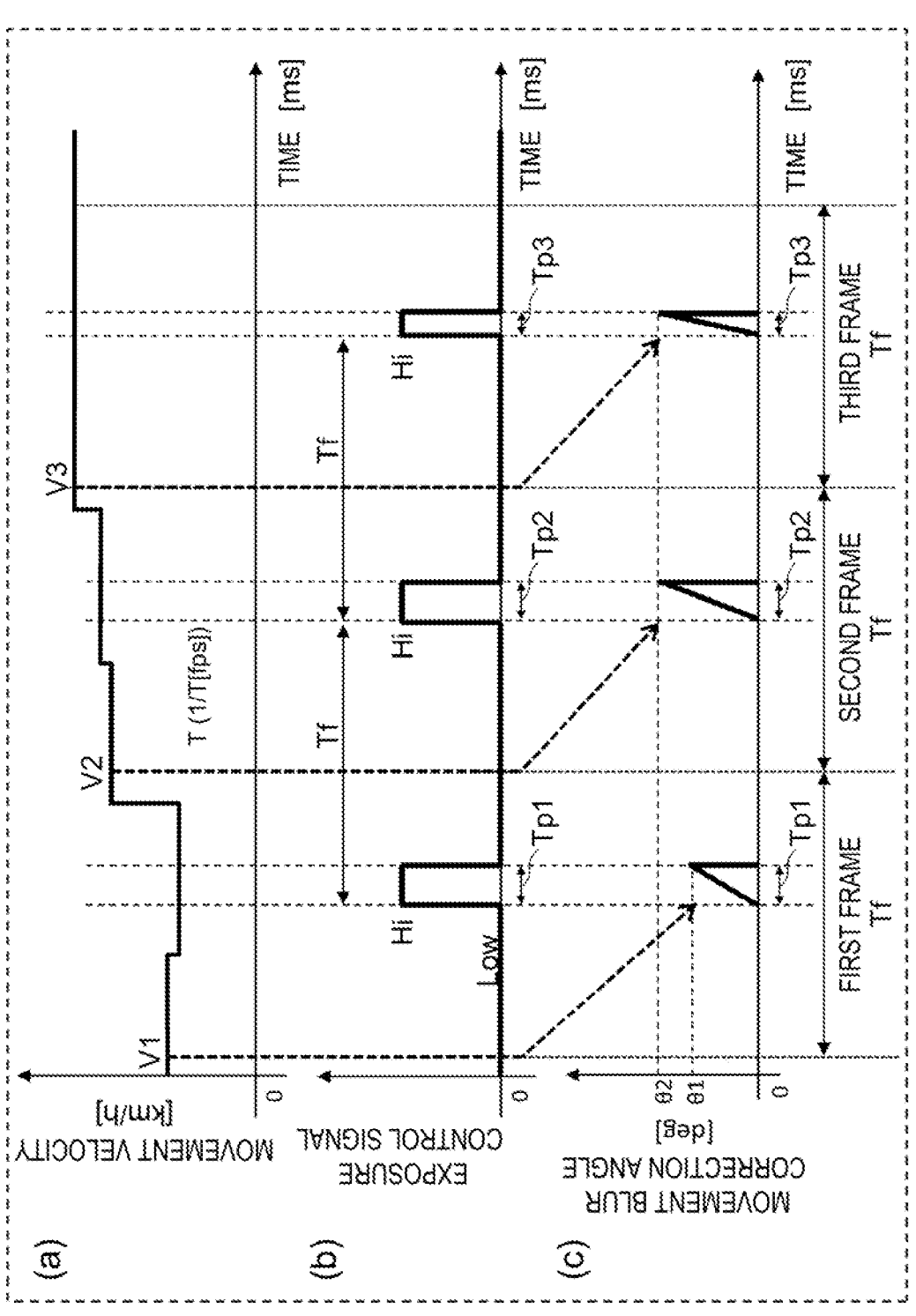
FIGS. 7(a) to 7(c) are graphs showing relationships among change in movement velocity, timing of exposure time, and movement blur correction angle.

Action of the imaging system 1 in the case of continuously capturing images, i.e., after again returning to step S1 will be described with reference to FIG. 7. FIG. 7 is a graph showing a relationship among change in movement velocity, timing of exposure time, and movement blur correction angle. FIG. 7(a) is a graph showing the movement velocity of the vehicle 3 that changes over time. FIG. 7(b) is a graph showing timing of exposure time at each frame. FIG. 7(c) is a graph showing the movement blur correction angle calculated for each frame. In FIG. 7(a), for example, with the movement velocities V1 and V2 being 75 km/h and 100 km/h, respectively, and the imaging interval of 1/60 sec, minute change in the vehicle velocity occurs once or twice during one frame.

In the case of continuously capturing images with the imaging interval Tf, at step S1, the movement velocity of the vehicle 3 is acquired every imaging interval Tf. For example, at timing of start of a first frame, the movement velocity V1 is acquired. At step S2, the controller 33 calculates the maximum exposure time Tmax from the acquired movement velocity V1, the maximum correctable angle θ max, etc., using Formula (2).

Next, the above step S3 is carried out in the same manner. Based on the exposure time of the preceding frame, the exposure time setting part 53 sets the first exposure time Tp1 adjusted to the maximum exposure time Tmax or less. At the first frame, a mirror swing angle α1 is calculated that corresponds to a movement blur correction angle θ1. Based on the mirror swing angle α1, the mirror pivotal velocity calculator 57 calculates the mirror pivotal velocity.

Next, the above step S4 is carried out in the same manner. Simultaneously with step S4, the controller 33 continues to send a Hi signal for instruction of exposure to the camera controller 27 during the first exposure time Tp1. In the imaging device 11, the camera controller 27 opens the shutter 24 for exposure during reception of the Hi signal, to acquire an image (step S5), and stores the acquired image into the storage 15. As regards start timing of the Hi signal for instruction of exposure sent from the controller 33 to the camera controller 27, the Hi signal is issued at the same timing for each imaging interval Tf.

Subsequently, the above step S6 and No of step S6 are carried out in the same manner, and image capturing at the first frame terminates, again returning to step S1 for capturing an image at the next second frame. Again at step S1, for example, at the start timing of the second frame, the movement velocity V2 is acquired that is greater than the movement velocity V1 of the first frame.

At step S2, the controller 33 calculates the maximum exposure time Tmax from the acquired movement velocity V2, the maximum correctable angle θ max, etc., using Formula (2). Next, the above step S3 is carried out in the same manner. Based on the first exposure time Tp1 of the first frame, the exposure time setting part 53 sets a second exposure time Tp2 adjusted to the maximum exposure time Tmax or less.

Since in FIG. 7, the movement velocity V2 of the second frame is greater than the movement velocity V1 of the first frame, a movement blur correction angle θ2 greater than the movement blur correction angle θ1 of the first frame and the mirror swing angle α1, and a mirror swing angle α2 are each calculated. Hereinafter, description will be given on the assumption that the movement blur correction angle 82 has reached, for example, the maximum correctable angle θ max. Based on the mirror swing angle α2, the mirror pivotal velocity calculator 57 calculates the mirror pivotal velocity. Subsequently, processes at steps S4 and S5 are performed in the same manner so that a captured image of the second frame can be obtained. Next, the procedure again returns to step S1 to capture an image at a third frame.

Again, at step S1, the movement velocity V3 greater than the movement velocity V2 of the second frame is acquired, for example, at start timing of the third frame.

At step S2, the controller 33 calculates the maximum exposure time Tmax from the acquired movement velocity V3, the maximum correctable angle θ max, etc., using Formula (2). The above step S3 is then carried out in the same manner. Based on the second exposure time Tp2 of the second frame, the exposure time setting part 53 sets a third exposure time Tp3 adjusted to the maximum exposure time Tmax or less. Though the maximum exposure time Tmax varies depending on the movement velocity of the vehicle 3, in the case where the exposure times Tp2 and Tp3 of the second and third frames are the maximum exposure times Tmax at their respective velocities, Tp2>Tp3 is established. That is, since in FIG. 7(c), the movement blur correction angle θ2 of the second frame has already reached the maximum correctable angle θ max, with the movement velocity of the third frame being faster than that of the second frame, the maximum exposure time capable of blur correction at the third frame becomes shorter. Therefore, the third exposure time Tp3 is set shorter than the second exposure time Tp2.

Though in FIG. 7(a), the movement velocity V3 of the third frame is greater than the movement velocity V2 of the second frame, since the movement blur correction angle θ2 of the second frame is the maximum correctable angle θ max, also at the third frame, the movement blur correction angle θ2 and the mirror swing angle α2 are calculated that are the same as those of the second frame. Since at this time, the blur correction angles of the second and third frames are each the maximum correctable angle θ max, even if the movement velocity V3 of the third frame is greater than the movement velocity V2 of the second frame, the movement blur correction angle of the third frame becomes equal to the movement blur correction angle θ2 of the second frame. Accordingly, the mirror pivotal velocity calculator 57 calculates the mirror pivotal velocity, based on the mirror swing angle α2 of the third frame. Subsequently, processes at steps S4 and S5 are performed in the same manner so that a captured image of the third frame can be obtained.

In the case of continuous image capturing, since the movement velocity is acquired at one-frame interval so that the movement blur correction angle is controlled depending on the movement velocity though minute change in the movement velocity occurs within one frame, it is possible to suppress blurring of images caused by change in the movement velocity. In the case where the exposure time setting part 53 always sets the exposure time Tp to the maximum exposure time Tmax, images having highest luminance can be acquired with blurring reduced though luminance changes on a frame-by-frame basis. In the case where the exposure time setting part 53 sets the exposure time Tp to certain exposure time less than the maximum exposure time Tmax and greater than the initial exposure time Tp0, it is possible to acquire images having relatively high luminance with reduced blurring and constant inter-frame luminance, enabling acquisition of easily visible images.

Effects, Etc.

In this manner, the imaging system 1 is the imaging system 1 located on the vehicle 3. The imaging system 1 includes: the imaging device 11 having the imaging element 25 that images the area 9 to be imaged spaced apart from the vehicle 3 and constituting at least a part of the surroundings of the vehicle 3; the blur correction assembly 31 that corrects blur in the movement direction when the imaging device 11 captures images during movement of the vehicle 3; and controller 33 that controls exposure time of the imaging device 11, based on the blur amount Sf correctable by the blur correction assembly 31 and corresponding to the maximum correctable angle θ max.

By controlling the exposure time of the imaging device 11 by the controller 33, based on the movement velocity of the vehicle 3 and the correctable blur amount Sf of the blur correction assembly 31, it is possible to reduce blurring and further to capture images with proper exposure time. Until now, in the case where the exposure time is not controlled based on the correctable blur amount with elongated exposure time under dark environment and with faster movement velocity of the vehicle 3, blurring beyond the correctable blur amount may have occurred and the inspection accuracy may have lowered due to blurring of images in spite of sufficiently secured light amount. Also in the past, blurless images having no problems with blur correction accuracy could be acquired since blur correction is feasible with smaller correction angle than the maximum correctable angle θ max, even in the case where the exposure time is not controlled based on the correctable blur amount with shortened exposure time and slowed movement velocity of the vehicle 3 to reliably achieve the blur correction. Under the dark environment, however, sufficient light amount may not be secured even if there is no blurring. The imaging system 1 of this embodiment optimizes the exposure time Tp on the assumption of blur correction, thereby rendering it possible to fully exsert the blur correction performance and secure light amount as much as possible, to achieve acquisition of bright and clear images.

OTHER EMBODIMENTS

As above, the embodiment has been described as an exemplification of technique disclosed in this application. However, the technique in this disclosure is not limited thereto, and is applicable to embodiments undergoing appropriate changes, permutations, additions, omissions, or the like. Other embodiments will thus be exemplified hereinbelow.

Figure 8:
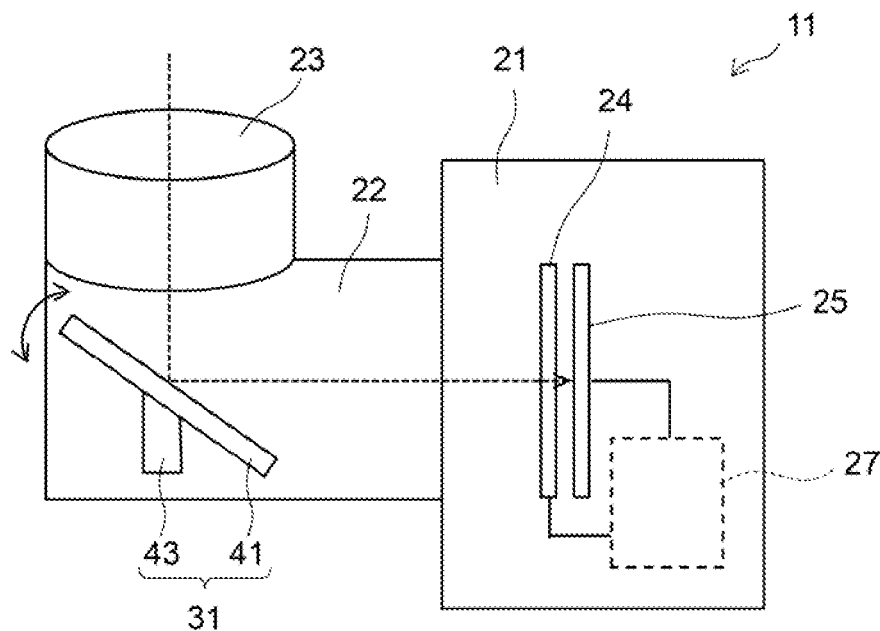
FIG. 8 shows a variant of an imaging device and a blur correction assembly.

Although in the above embodiment, the imaging device 11 and the blur correction assembly 31 are located separately from each other, this is not limitative. As shown in FIG. 8, the imaging device 11 may include a housing 22 that connects the lens 23 and the camera body 21, with the blur correction assembly 31 being housed in the housing 22.

Although the above embodiment utilizes information of the movement velocity V1 provided from the velocity detector 3a of the vehicle 3, this is not limitative. The imaging system 1 may include a velocity detector that detects the movement velocity of the imaging system 1. The velocity detector may be one utilizing a global positioning system (GPS).

Although in the above embodiment, the imaging system 1 images a wall surface above and lateral to the vehicle 3, this is not limitative. The imaging system 1 may image a road surface below the vehicle 3. From the captured images, a pothole, a crack, a rut, etc., generated on the road surface can be detected by the image processing.

In the above embodiment, the case has been described where the moving body is the vehicle 3 such as an automobile. However, the moving body is not limited to the vehicle 3, and can be a vehicle such as a train or a motorcycle that runs on land, a ship sailing on the sea, or a flying object such as an airplane or a drone that flies in the sky. In the case where the moving body is the ship, the imaging system 1 captures images of a bridge pier, a bottom surface of a bridge girder, as well as a structure built along the shore. In the case where the moving body is the train, overhead wires are imaged so that the position and wear of the overhead wires can be detected.

Although in the above embodiment, images by ambient light reflected on the area 9 to be imaged are captured, this is not limitative. Images by reflected light of light irradiated toward the area 9 to be imaged from the moving body or the imaging system may be captured.

Summary of Embodiment (1) An imaging system of the present disclosure is an imaging system disposed on a moving body, including: an imaging device having an imaging element that images an object to be imaged spaced apart from the moving body, the object to be imaged constituting at least a part of surroundings of the moving body; a blur correction assembly that corrects blur in movement direction of the moving body when the imaging device captures images during movement of the moving body; and a controller that controls exposure time of the imaging device, based on a movement velocity of the moving body and a correctable blur amount by the blur correction assembly.

It is thus possible to reduce blurring and acquire images captured with proper exposure time.

(2) In the imaging system of (1), the blur correction assembly is a assembly that aligns direction of ambient light reflected on the object to be imaged and imaging direction of the imaging element, wherein the correctable blur amount is defined by a changeable maximum angle of the blur correction assembly, and wherein the controller controls the blur correction assembly, based on the correctable blur amount, the movement velocity, and the exposure time.

(3) In the imaging system of (2), the blur correction assembly includes: a mirror that totally reflects ambient light reflected on the object to be imaged, toward direction of the imaging element; and a mirror drive that pivotally drives the mirror, wherein the correctable blur amount is defined by a pivotal angle of the mirror and a pixel range of the imaging element, and wherein the controller controls pivoting of the mirror effected by the mirror drive, based on the correctable blur amount, the movement velocity, and the exposure time.

(4) In the imaging system of (3), the controller calculates a maximum exposure time allowing image capturing of the imaging device, based on the movement velocity of the moving body and the correctable blur amount.

(5) In the imaging system of (4), the controller controls exposure time of the imaging device to be the maximum exposure time or less.

(6) In the imaging system of (5), the controller extends the exposure time previously set corresponding to the movement velocity of the moving body, to time equal to or less than the maximum exposure time in the case where the pivotal angle corresponding to the movement velocity of the moving body is smaller than a maximum correctable angle drivable by the mirror drive, and the controller sets the exposure time previously set corresponding to the movement velocity of the moving body to the maximum exposure time in the case where the pivotal angle corresponding to the movement velocity of the moving body is greater than the maximum correctable angle.

(7) In the imaging system of any one of (4) to (6), the controller sets the maximum exposure time to time equal to or less than an imaging interval of continuous image capturing.

(8) The imaging system of any one of (1) to (7), including a velocity detector that detects the movement velocity of the imaging system.

(9) In the imaging system of any one of (1) to (8), the controller sets the exposure time before image capturing each time the imaging device captures an image.

(10) A moving body of the present disclosure includes the imaging system of any one of (1) to (9). Thus, the imaging system can capture images of surroundings of the moving body with reduced blur while the moving body is moving.

The imaging system described in the present disclosure is implemented in cooperation with hardware resources, for example, a processor, a memory, and a program.

The present disclosure is applicable to an imaging system located on a moving body that moves.

EXPLANATIONS OF LETTERS OR NUMERALS 1 imaging system
3 vehicle
3a velocity detector
5 tunnel
5a wall surface
5b hole
5c crack
7 operation part
9 area to be imaged
11 imaging device
13 blur correction device
15 storage
17 controller
21 camera body
23 lens
24 shutter
25 imaging element
27 camera controller
31 blur correction assembly
33 controller
41 mirror
43 mirror drive
51 maximum exposure time calculator
53 exposure time setting part
55 mirror swing angle calculator
57 mirror pivotal velocity calculator
α mirror swing angle
F focal length
M subject magnification
Tf imaging interval
Tmax maximum exposure time
θ max maximum correctable angle
V1 movement velocity

What is claimed is:

1. An imaging system disposed on a moving body, comprising:
   an imaging device having an imaging element that images an object to be imaged spaced apart from the moving body, the object to be imaged constituting at least a part of surroundings of the moving body;
   a blur correction assembly that corrects blur in movement direction of the moving body when the imaging device captures images during movement of the moving body; and
   a controller that controls exposure time of the imaging device, based on a movement velocity of the moving body and a correctable blur amount by the blur correction assembly,
   wherein the blur correction assembly comprises:
      a mirror that totally reflects ambient light reflected on the object to be imaged, toward direction of the imaging element; and
      a mirror drive that pivotally drives the mirror,
   wherein the correctable blur amount is defined by a pivotal angle of the mirror and a pixel range of the imaging element, and
   wherein the controller controls pivoting of the mirror effected by the mirror drive, based on the correctable blur amount, the movement velocity, and the exposure time.

2. The imaging system according to claim 1, wherein the blur correction assembly is an assembly that aligns direction of ambient light reflected on the object to be imaged and imaging direction of the imaging element, wherein the correctable blur amount is defined by a changeable maximum angle of the blur correction assembly, and wherein the controller controls the blur correction assembly, based on the correctable blur amount, the movement velocity, and the exposure time.

3. The imaging system according to claim 2, wherein the controller calculates a maximum exposure time allowing image capturing of the imaging device, based on the movement velocity of the moving body and the correctable blur amount.

4. The imaging system according to claim 3, wherein the controller controls the exposure time of the imaging device to be the maximum exposure time or less.

5. The imaging system according to claim 4, wherein the controller extends the exposure time previously set corresponding to the movement velocity of the moving body, to time equal to or less than the maximum exposure time in the case where the pivotal angle corresponding to the movement velocity of the moving body is smaller than a maximum correctable angle drivable by the mirror drive, and wherein the controller sets the exposure time previously set corresponding to the movement velocity of the moving body to the maximum exposure time in the case where the pivotal angle corresponding to the movement velocity of the moving body is greater than the maximum correctable angle.

6. The imaging system according to claim 5, wherein the controller sets the maximum exposure time to time equal to or less than an imaging interval of continuous image capturing.

7. The imaging system according to claim 2, wherein the controller sets the exposure time before image capturing each time the imaging device captures an image.

8. The imaging system according to claim 1, wherein the controller calculates a maximum exposure time allowing image capturing of the imaging device, based on the movement velocity of the moving body and the correctable blur amount.

9. The imaging system according to claim 8, wherein the controller controls the exposure time of the imaging device to be the maximum exposure time or less.

10. The imaging system according to claim 9, wherein the controller extends the exposure time previously set corresponding to the movement velocity of the moving body, to time equal to or less than the maximum exposure time in the case where the pivotal angle corresponding to the movement velocity of the moving body is smaller than a maximum correctable angle drivable by the mirror drive, and wherein the controller sets the exposure time previously set corresponding to the movement velocity of the moving body to the maximum exposure time in the case where the pivotal angle corresponding to the movement velocity of the moving body is greater than the maximum correctable angle.

11. The imaging system according to claim 8, wherein the controller sets the maximum exposure time to time equal to or less than an imaging interval of continuous image capturing.

12. The imaging system according to claim 1, comprising: a velocity detector that detects the movement velocity of the imaging system.

13. The imaging system according to claim 1, wherein the controller sets the exposure time before next image capturing each time the imaging device captures an image.

14. A moving body, comprising: the imaging system disposed on the moving body, wherein the imaging system comprises: an imaging device having an imaging element that images an object to be imaged spaced apart from the moving body, the object to be imaged constituting at least a part of surroundings of the moving body;

a blur correction assembly that corrects blur in movement direction of the moving body when the imaging device captures images during movement of the moving body; and a controller that controls exposure time of the imaging device, based on a movement velocity of the moving body and a correctable blur amount by the blur correction assembly, wherein the blur correction assembly comprises: a mirror that totally reflects ambient light reflected on the object to be imaged, toward direction of the imaging element; and a mirror drive that pivotally drives the mirror, wherein the correctable blur amount is defined by a pivotal angle of the mirror and a pixel range of the imaging element, and wherein the controller controls pivoting of the mirror effected by the mirror drive, based on the correctable blur amount, the movement velocity, and the exposure time.

* * * * *